Patented Oct. 28, 1952

2,615,806

UNITED STATES PATENT OFFICE 2,615,806

METHOD OF MAKING RIGID TYPE FELTED MINERAL WOOL PRODUCT

Frank L. Marsh, Carl J. Koehler, and Willard L. Chrisler, Kenmore, N. Y., assignors to National Gypsum Company, Buffalo, N. Y., a corporation of Delaware No Drawing. Application April 12, 1947,
Serial No. 740,992

4 Claims. (Cl. 92—21)

The present invention relates to a rigid type felted mineral wool product and to the method of making the same. The term "mineral wool" is employed herein in a generic sense to denote fibers formed from fused conventional raw mineral materials and mixtures thereof, such as from rock, slag and glass.

Heretofore the manufacture of rigid type felted mineral wool products has presented many difficulties resulting in expensive processing and an inferior product. As heretofore commercially practiced, the manufacture of such mineral wool products of this nature involved the following steps:

In a paper beater, newspaper scrap was mixed with hot water and beaten to a mass of fiber suspended in the water. Melted asphalt or a mixture of melted asphalt and wax was added to this beater stock and thoroughly incorporated. The beater stock was then transferred to a suitable mixing vat where mineral wool was introduced and the mass agitated until homogeneous. The mixture was then conveyed from the mixing vat to a forming machine where the mass was formed into blocks. The forming machine was a suitably sized box, the bottom of which was formed by a wire screen. Suction was applied to the area under the screen to draw the water from the mass in the box and deposit the paper pulp, asphalt and mineral wool in the form of a block, in a wet state, on the screen. When all of the water, except that tenaciously held by the solid matter, was removed, the wet block was transferred from the screen to a tray. The trays on which the blocks reposed were then passed through a drying kiln where the remainder of the water was removed from the block and the asphalt melted to cause it to flow and bond the fibers together. Because of shrinkage during drying, the wet block was molded somewhat larger than the desired dimensions and after drying was passed between dimension saws which trimmed it to the desired exact size.

Among the objectionable features of the above process was the fact that since the asphalt was required to be melted and dispersed in liquid form the entire bulk of materials handled was required to be heated and held at a relatively high temperature throughout the various steps, this rendering the process costly. In the practice of the present invention, heating the asphalt or stock prior to kiln drying is neither necessary nor desirable.

Furthermore, the above prior art process, wherein melted asphalts were employed and dispersed and conveyed in hot water, necessarily involved the use of lower melting point asphalts. Although high melting point asphalts were desired, those with melting points in excess of 100° F. could not be used without the addition of wax to lower the melting point of the mixture. When asphalts with melting points approaching 200° F. were used, the greatly increased amount of wax required to make a workable mixture not only made the process expensive but resulted in a weakened product. Testing has shown that a product made using low melting point asphalt, or asphalt and wax mixture, had a modulus of rupture from 37–42, whereas the product formed in accordance with the present invention, in which higher melting point asphalts are used, is found to have a modulus of rupture in the order of 69.

Furthermore, with the above prior art process, the lower melting point asphalts tended to flow and encase the formed block, thereby retarding the drying of the interior regions. This disadvantage is not encountered in the practice of the present invention since higher melting point asphalts are employed which do not flow until practically all of the water has been evaporated.

A further advantage of the present invention over the above prior art process is that the higher melting point asphalts used are less likely to catch and support fire during drying. This also makes is possible to use higher temperatures in the kiln which increase the efficiency of this step.

A further advantage in the use of higher melting point asphalts is that the product is harder and will support greater weight without deformation than a similar product in which asphalts of lower melting points are employed.

A further advantage of the use of higher melting point asphalts is that a lower density product can be made. Under similar conditions the product of the above prior art method was found to have a density of 15 pounds per cubic foot, whereas in the practice of the present invention, a superior product weighing 12 pounds per cubic foot can be made.

Accordingly, one of the principal objects of the present invention is to provide a rigid type insulation product of felted mineral wool bonded with asphalt, which, as compared with the product of the said prior art process, is lower in cost, has a higher modulus of rupture, can be made of lower density, and possesses greater load carrying ability.

Another principal object of the present invention is to provide a process for making such an insulation product which overcomes the above disadvantages of said prior art process in providing a process which is less hazardous and can be carried out more rapidly and at lower cost.

Further objects and advantages of this invention will be apparent when reference is made to the description thereof which follows:

In the practice of the present invention, the asphalt is used in comminuted form, the asphalt employed preferably having a higher melting point than the asphalt used in the said prior art process. Any asphalt having a melting point in excess of 200° F. is suitable.

The comminuted asphalt is first thoroughly mixed with a pulp or slurry of a fibrous binder material such as suitable mineral or vegetable fibers which act as a carrier for the comminuted asphalt and as a binding agent in the finished product. This pulp or slurry is prepared by mixing the mineral or vegetable fibers with water. The mineral or vegetable fibers used should have irregular, scaley or friction-producing surfaces. Examples of such fibers are asbestos, paper scrap, bagasse, corn stalks, or other suitable cellulosic fibers. Mixtures of these fibers can be employed. A wetting or dispersing agent is preferably employed to secure dispersion of the comminuted asphalt in the pulp or slurry. Any suitable wetting or dispersing agent can be employed and it is preferred that one be used which cannot be reactivated under the ordinary circumstances to which the final insulation product is exposed. It is preferred that 0.1 to 1 part by weight of wetting or dispersing agent be employed.

Mineral wool, in the form of granulated, shredded or loose wool, is then thoroughly but gently mixed with the pulp or slurry so prepared, the gentle mixing being required to avoid breaking up the mineral wool fibers. Following this the mixture of mineral wool and pulp or slurry is molded into bodies of the desired form and the free water removed therefrom, preferably by suction. The bodies are then heated to a temperature above the melting point of the asphalt employed to fuse the asphalt particles and to drive off any remaining water. This results in a rigid type felted insulation product in which the fibrous binder material and asphalt are substantially uniformly disseminated throughout the mineral wool. Following this drying and fusing step the bodies can be split, sawed or sanded to produce the desired finished product.

As an example of our preferred form of practicing the present invention, newspaper scrap and water containing a wetting or dispersing agent are placed in a paper beater or the like and beaten to a pulp or slurry in the conventional manner. Newspaper pulp is preferred because of its cheapness.

The wetting or dispersing agent preferred is made by mixing 150 parts, by weight, of soybean protein in 1350 parts, by weight, of water, adding 15 parts, by weight, of commercial ammonium hydroxide and stirring until the protein is dissolved. A small amount of any suitable fungicide or insecticide can be added as a preservative. The preferred fungicide and insecticide is sodium pentachlorphenate, this fungicide and insecticide serving to prevent deterioration of the derivatives of the soybean protein remaining in the finished product. We do not confine ourselves to the use of these proportions as other proportions will serve nearly as well. Soybean protein is preferred because it is both effective and inexpensive, and, with the ammonium hydroxide, it first forms a soluble soap which is effective as a wetting and dispersing agent and, thereafter, when subjected to heat, the ammonium hydroxide is driven off leaving a water insoluble proteinate which is substantially inert and cannot be reactivated. This eliminates any tendency of the wetting or dispersing agent in the finished product to absorb moisture. However, we do not confine ourselves to the use of soybean protein as other proteins, vinsol resins, the sulfonated oils, soaps and the like serve equally as well. The wetting or dispersing agent can be added to the pulp or slurry at any time, but it is preferred to add it just before the addition of the comminuted asphalt to avoid the formation of foam as much as possible.

Comminuted asphalt having a relatively high melting point is then added to the pulp or slurry in the paper beater and thoroughly mixed. While any asphalt having a melting point not less than 200° F. can be used, we prefer to use an asphalt having a melting point between 200° F. and 250° F. If asphalts having a melting point less than 200° F. are attempted to be used, difficulties are encountered in comminuting or pulverizing the same. We prefer to use comminuted asphalt that will all pass through a standard U. S. No. 50 sieve. However, it is to be understood that we do not limit ourselves to the use of comminuted asphalt having these preferred physical properties inasmuch as it has been found that higher or lower melting point asphalt as well as coarser or finer comminuted asphalts can be employed.

After the comminuted asphalt has been thoroughly mixed with the pulp or slurry, the mixture is transferred to a large chest equipped with a slow moving agitator where mineral wool is introduced and the mass thoroughly mixed. It is important that this mixing be done gently as violent agitation will break up the mineral wool fibers. We prefer to use the product known in the art as "granulated wool" but shredded or loose wool can also be employed. The mixture we prefer to employ consists of approximately the following amounts of ingredients, by weight:

1500 water
70 mineral wool
15 paper pulp
15 comminuted asphalt
0.15 wetting agent A measured volume of the above mixture, containing the required amount of solids to form a block of the desired thickness, is transferred to the chest of a suitable block molding machine having a bottom screen. The mixture is evenly distributed over the bottom screen of the chest to insure formation of a block of uniform density which will shrink uniformly on drying and make possible the cutting or splitting of the original block to any dimension, each piece thus formed having the same physical characteristics. Following the even distribution of the solids, vehicular water is withdrawn by suction from the mass and a wet block formed of the solid materials is retained in the forming machine. Before removal from the forming machine, the wet block may be compressed to any desired density or dimension.

The wet block so formed is then conveyed to a drying kiln, operated at about 300° F. which removes the entrained water and causes the asphalt to melt and bond the fibers together. It has been determined that about 2.8 pounds of water per board foot are removed during this step. The temperature to which the wet block is dried is not critical as long as the temperature employed is in excess of the melting point of the asphalt. The length of time during which the block is subjected to heat is also not critical, it being necessary only to leave the block in the drying kiln a sufficient length of time to insure the removal of all water and fusing of the asphalt.

After the block has been so dried, it can be sawed or sanded to the desired dimensions. Dimensioning of the block while in its wet form is not practicable. The production of thinner sizes can be accomplished by splitting a stock sized block during the process of trimming, thereby accomplishing a considerable saving in waste due to trimming blocks approximately formed to the thinner sizes.

Having thus described the invention in full detail, it will be understood that the details need not be strictly adhered to but that various changes and modifications will suggest themselves to one skilled in the art, all falling within the scope of the invention as defined in the subjoined claims in which the reference to parts or proportions is by weight.

We claim:

1. The method which comprises providing a slurry by thoroughly mixing about 15 parts of comminuted asphalt having a melting point falling within the range of from 200° to 250° F., about 15 parts of fibrous binder material, about 1500 parts of water and from 0.1 to 1 part of a dispersing agent for the comminuted asphalt, thoroughly but gently mixing into the slurry about 70 parts of mineral wool fibers to distribute the comminuted asphalt and fibrous binder material substantially uniformly throughout the mineral wool fibers, molding the last mentioned mixture into a body, rapidly withdrawing the free water from the body by suction before the various solid components thereof have an opportunity to stratify into layers thereby to provide a loosely felted and intersticed homogeneous mass, and thereafter heating the mass at a temperature sufficient to evaporate the residual water therein and to fuse the asphalt thereby to provide upon cooling a rigid and lightweight composition in which the mineral wool fibers are bonded together and to the fibrous binder material by the asphalt.

2. The method which comprises providing a slurry by thoroughly mixing about 15 parts of comminuted asphalt having a melting point falling within the range of from 200° to 250° F. and capable of passing a 50 mesh screen, 15 parts of fibrous binder material, about 1500 parts of water and from 0.1 to 1 part of a dispersing agent for the comminuted asphalt, thoroughly but gently mixing into the slurry about 70 parts of mineral wool fibers to distribute the comminuted asphalt and fibrous binder material substantially uniformly throughout the mineral wool fibers, molding the last mentioned mixture into a body, rapidly withdrawing the free water from the body by suction before the various solid components thereof have an opportunity to stratify into layers thereby to provide a loosely felted and intersticed homogeneous mass, and thereafter heating the mass at a temperature sufficient to evaporate the residual water therein and to fuse the asphalt thereby to provide upon cooling a rigid and lightweight composition in which the mineral wool fibers are bonded together and to the fibrous binder material by the asphalt.

3. The method which comprises providing a slurry by thoroughly mixing about 15 parts of comminuted asphalt having a melting point falling within the range of from 200° to 250° F. and capable of passing a 50 mesh screen, about 15 parts of paper fibers, about 1500 parts of water and about 0.15 part of a dispersing agent for the comminuted asphalt and comprising soybean protein and ammonium hydroxide, thoroughly but gently mixing into the slurry about 70 parts of mineral wool fibers to distribute the comminuted asphalt and paper fibers substantially uniformly throughout the mineral wool fibers, molding the last mentioned mixture into a body, rapidly withdrawing the free water from the body by suction before the various solid components thereof have an opportunity to stratify into layers thereby to provide a loosely felted and intersticed homogeneous mass, and thereafter heating the mass at a temperature sufficient to evaporate the residual water therein and to fuse the asphalt thereby to provide upon cooling a rigid and lightweight composition in which the mineral wool fibers are bonded together and to the paper fibers by the asphalt.

4. The method which comprises providing a slurry by thoroughly mixing about 15 parts of comminuted asphalt having a melting point falling within the range of from 200° to 250° F., about 15 parts of fibrous binder material, about 1500 parts of water and from 0.1 to 1 part of a dispersing agent for the comminuted asphalt and substantially incapable of being reactivated under the ordinary circumstances to which the end product is exposed, thoroughly but gently mixing into the slurry about 70 parts of mineral wool fibers to distribute the comminuted asphalt and fibrous binder material substantially uniformly throughout the mineral wool fibers, molding the last mentioned mixture into a body, rapidly withdrawing the free water from the body by suction before the various solid components thereof have an opportunity to stratify into layers thereby to provide a loosely felted and intersticed homogeneous mass, and thereafter heating the mass at a temperature sufficient to evaporate the residual water therein and to fuse the asphalt thereby to provide upon cooling a rigid and lightweight composition in which the mineral wool fibers are bonded together and to the fibrous binder material by the asphalt.

FRANK L. MARSH.
CARL J. KOEHLER.
WILLARD L. CHRISLER.

REFERENCES CITED

The following references are of record in the file of this patent:

UNITED STATES PATENTS

| Number | Name | Date |
|---|---|---|
| 1,078,307 | Parkison | Nov. 11, 1913 |
| 1,887,726 | Weber | Nov. 15, 1932 |
| 1,900,699 | Ellis | Mar. 7, 1933 |
| 1,939,616 | Becher | Dec. 12, 1933 |
| 2,072,687 | Robinson | Mar. 2, 1937 |
| 2,162,386 | Neuhof | June 13, 1939 |
| 2,190,034 | Levin | Feb. 13, 1940 |
| 2,264,189 | Richter et al. | Nov. 25, 1941 |
| 2,383,066 | McDermott | Aug. 21, 1945 |
| 2,395,301 | Sloan | Feb. 19, 1946 |
| 2,404,463 | Schmidt | July 23, 1946 |
| 2,417,851 | Young | Mar. 25, 1947 |
| 2,504,744 | Sproull et al. | Apr. 18, 1950 |
| 2,538,926 | Sutherland | Jan. 23, 1951 |

FOREIGN PATENTS

| Number | Country | Date |
|---|---|---|
| 7,678 | Great Britain | Mar. 30, 1898 |